(12) United States Patent
Janky et al.

(10) Patent No.: US 6,587,891 B1
(45) Date of Patent: Jul. 1, 2003

(54) METHOD AND APPARATUS FOR DETERMINING POSITION USING A HANDHELD PERSONAL COMPUTER AND A CRADLE

(75) Inventors: Greg Janky, Seattle, WA (US); Bruce Peetz, Los Gatos, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 10/136,878

(22) Filed: Apr. 30, 2002

Related U.S. Application Data

(63) Continuation of application No. 09/345,622, filed on Jun. 30, 1999, now Pat. No. 6,496,874.

(51) Int. Cl.[7] ................................................ G06F 3/00
(52) U.S. Cl. ............................. 710/1; 710/72; 710/106; 701/207; 701/212
(58) Field of Search ............................. 710/1, 2, 7, 20, 710/33, 62, 73, 101, 108, 106, 207, 212, 213, 15, 19, 38, 63, 64, 72

(56) References Cited

U.S. PATENT DOCUMENTS

| | | | | |
|---|---|---|---|---|
| 5,528,248 A | * | 6/1996 | Steiner et al. ............... 342/357 |
| 5,832,247 A | * | 11/1998 | Gildea et al. ................ 710/129 |
| 6,083,353 A | * | 7/2000 | Alexander et al. ........... 202/158 |
| 6,094,625 A | * | 7/2000 | Ralston ....................... 702/150 |
| 6,266,612 B1 | * | 7/2001 | Dussell et al. ............... 701/207 |
| 6,326,916 B1 | * | 12/2001 | Green .................... 342/357.09 |
| 6,411,899 B2 | * | 6/2002 | Dussell et al. ............... 701/211 |

* cited by examiner

Primary Examiner—Jeffrey Gaffin
Assistant Examiner—Rijue Mai
(74) Attorney, Agent, or Firm—Wagner, Murabito & Hao LLP

(57) ABSTRACT

A method and apparatus for determining position using a handheld personal computer. A cradle is disclosed that that is adapted to couple to a handheld personal computer. In one embodiment, the cradle includes projecting members that capture the handheld personal computer and hold it securely in place. The cradle includes a position determining system that is adapted to determine position. Upon coupling the cradle to a handheld personal computer, the cradle is operable to determine position. Once position is determined, the determined position is displayed on the display of the handheld personal computer. The display can include a display of a moving map and an icon indicating the current position relative to the map. All required hardware and software for storing the map database and for determining position are included within the cradle.

18 Claims, 11 Drawing Sheets

METHOD AND APPARATUS FOR DETERMINING POSITION USING A HANDHELD PERSONAL COMPUTER AND A CRADLE

This is a continuation of application Ser. No. 09/345,622, filed Jun. 30, 1999, now U.S. Pat. No. 6,496,874, issued Dec. 17, 2002.

TECHNICAL FIELD

This invention relates to systems and methods for determining position. More specifically, the present invention relates to an apparatus and method for determining position using a handheld personal computer.

BACKGROUND ART

Handheld personal computers are currently available in a wide variety of sizes and styles. Configurations range from credit card sized devices to larger, full function handheld computers. Handheld personal computers range from several ounces to as much as a pound in weight. These handheld personal computers run (or function) on a variety of operating systems, many of which use Microsoft's Windows CE operating system. Recent designs of handheld computers provide many the functions the full-size computers. Some handheld personal computers include slots, typically referred to as PC card slots, that are adapted to receive removable storage media such as, for example, PC cards (e.g. PCMCIA cards), Flash ROM cards, etc. A variety of auxiliary devices can also be coupled to the handheld personal computer via the PC card slot.

One style of handheld personal computer includes a relatively flat housing that is typically rectangular. A display fits within the front of the handheld personal computer. Typically, function keys are also included on the front of this style of handheld personal computer. A touch screen allows for input by touch or stylus. Examples of this type of personal computer include the Apple message pad 2100, manufactured by Apple Computer Inc., Cupertino, Calif. the Avigo 10, manufactured by Texas Instruments Corp., of Dallas, Tex. the PalmPilot professional, manufactured by 3Com Corp. of Mountain View, Calif. and the Cassiopia handheld personal computer, manufactured by Casio Inc., of Dover, N.J.

Recently, position determination systems have been manufactured that are adapted to couple to a computer. These position determination systems have been widely used in conjunction with laptop computers for mapping and surveying applications. Typically, such prior art position determination systems include a separate GPS device that is connected to the laptop computer using a PC card and a cable. One end of the cable attaches to the GPS device and the other end attaches to the PC card. In order to attach this type of prior art GPS system to the laptop computer, the user must first insert the PC card into the PC card slot in the laptop computer. The user must then connect the cable to both the GPS device and to the PC card. Though the use of a laptop computer allows for portability, the resulting assembly is bulky and is difficult to carry around. That is, in order to carry around this type of prior art system the user must typically use two hands, one hand for holding the laptop computer, and the other hand for holding the GPS device.

These prior art systems require that a software program be loaded onto the laptop computer. This is typically not a problem with using a full function laptop computer because such computers typically now include a CD ROM or a floppy drive that can be used to download the required software. However, the software program does require dedicated memory storage space in the laptop computer.

The use of prior art GPS systems that are designed for use with full-size computers or laptop computers is problematic for many handheld personal computers because most handheld personal computers do not have input and output devices such as CD ROM or floppy drives for the required input. Thus, in order to download the necessary software program, the user must use a full-size personal computer. Typically, this process is accomplished by downloading the software program onto a full-size personal computer and inserting the handheld personal computer into a docking station that couples the handheld personal computer electronically to the full-size computer. The software packages then imported onto the handheld personal computer. This process is time consuming and it requires a full-size computer. In addition, such computer programs typically require more memory storage capacity than can be accommodated by the handheld personal computer. Even if the handheld personal computer include sufficient memory storage capability, such memory storage capability is often required for running other programs.

Even if prior art GPS systems that include PC cards that couple a GPS device to a computer could be adapted for use on a handheld personal computer that includes a PC card slot, the resulting assembly would be bulky and difficult to carry around. More specifically, in order to carry around this type of prior art system, the user must typically use two hands, one hand for holding the handheld personal computer, and the other hand for holding the GPS device. Also, each time the system is to be used, the user must insert the PC card and connect the cable to the PC card and to the GPS device. Also, the software download process must be performed using a computer that includes a CD ROM or floppy drives for the required input.

What is needed is a method and apparatus for determining position using a handheld computer that does not require the use of multiple devices that are coupled via cable. Also, a method and apparatus for determining position using a handheld computer that does not require that software be downloaded onto the handheld computer using a laptop computer or a full size computer. Also, what is needed is a method and apparatus for determining position using a handheld computer that is compact, easy to carry, and integrates functionally with a handheld personal computer. The present invention meets the above needs.

DISCLOSURE OF THE INVENTION

The present invention provides a method and apparatus for determining position using a handheld personal computer. The method and apparatus of the present invention easily couples to a handheld personal computer such that one-hand operations possible.

A cradle for a handheld personal computer is disclosed. The cradle is adapted to receive the handheld personal computer such that the cradle and the handheld personal computer are coupled together. This allows for the cradle in the handheld personal computer to be operated as a unit, easily carried around an easily operated as a system that can be held the palm of a user's hand.

In one embodiment, a cradle is disclosed that includes extending members on opposite ends of the cradle. A handheld personal computer may easily be coupled to the cradle by placing the handheld computer into the cradle and pressing down on the top of the handheld personal computer.

This flexes the extending members such that the handheld personal computer is captured between the extending members on either end of the cradle. Once the personal computer is captured, a connection mechanism electrically couple's the handheld personal computer to the cradle.

The resulting assembly is easily carried in one hand and is of a convenient size for handheld operation.

In one embodiment, all of the necessary information, instructions, programming, and hardware for determining position is incorporated into the cradle. Thus, there is no need for separately downloading any type of software program to the handheld personal computer as is required in prior art systems. In one embodiment of the present invention, a map database is stored in the cradle. This map database is used to display location, movement, waypoints, etc. in conjunction with the maps stored in the map database.

Thus, the method and apparatus for determining position using a handheld computer of the present invention does not require the use of multiple devices that are coupled via cable. Also, the method and apparatus for determining position using a handheld computer of the present invention does not require that software be downloaded onto the handheld computer using a full size computer or a laptop computer. Also, the method and apparatus of the present invention produces a device that is easily coupled to a handheld computer so as to produce an assembly that is compact and easy to carry. Also, the method and apparatus of the present invention integrates functionally with a handheld personal computer such that it does not interfere with the other operations of the laptop computer. By not requiring that a software program be stored on the handheld personal computer at all times, the apparatus and method of the present invention works in conjunction with handheld computers that do not have large amounts of available memory storage.

These and other objects and advantages of the present invention will no doubt become obvious to those of ordinary skill in the art after having read the following detailed description of the preferred embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
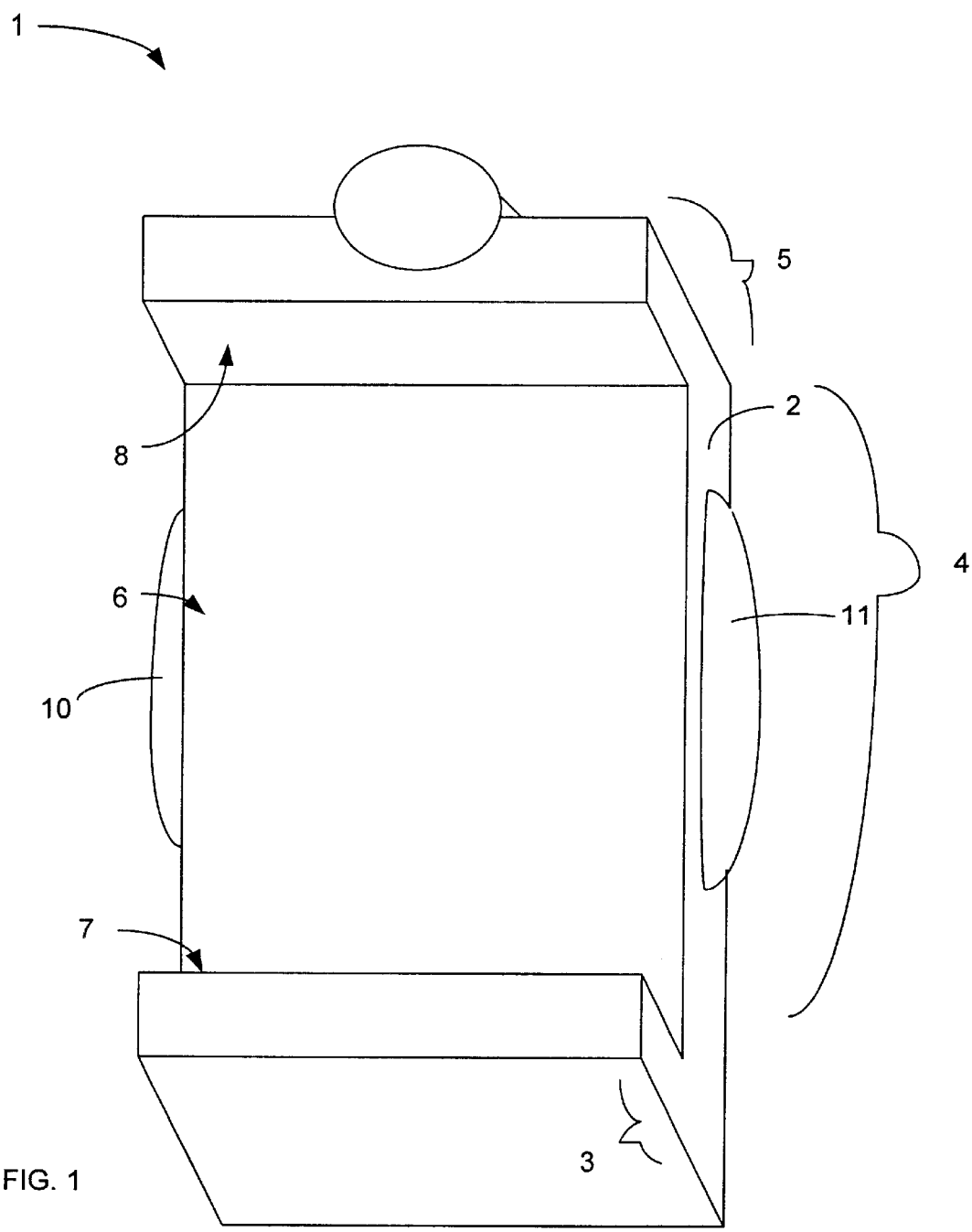
FIG. 1 is a top perspective view showing a cradle in accordance with one embodiment of the present claimed invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "designating," "incorporating," "calculating," "determining," "communicating" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices.

FIG. 1 shows cradle 1 to include a housing 2 that includes main body 4 from which projecting member 3 and projecting member 5 project. Projecting member 3 extends from one end of main body 4 and projecting member 5 extends from the opposite end of main body 4. Housing 2 includes receiving surfaces 6–8 that are adapted to receive a handheld personal computer.

In one embodiment housing 2 is formed a plastic that is flexible such that projecting member 5 and projecting member 3 flex relative to main body 4. Alternatively, housing 2 is made of rubber so as to facilitate flexure of projecting member 3 and projecting member 5. However, alternatively, housing 2 may be of any of a number of other materials such as metals, composites, etc. that can flex or otherwise move so as to capture a handheld personal computer. In one embodiment of the present invention housing 2 is contoured to the shape of a user's hand and includes molded shape 10 and molded shape 11 that extended laterally from the main body 4 so as to facilitate handheld use. In one embodiment housing 2 is a single injection molded plastic part and main body 4, projecting member 3 and projecting member 5 are integrally formed thereby. In this embodiment, molded shape 10 molded shape 11 are also integrally formed within housing 2.

Figure 2:
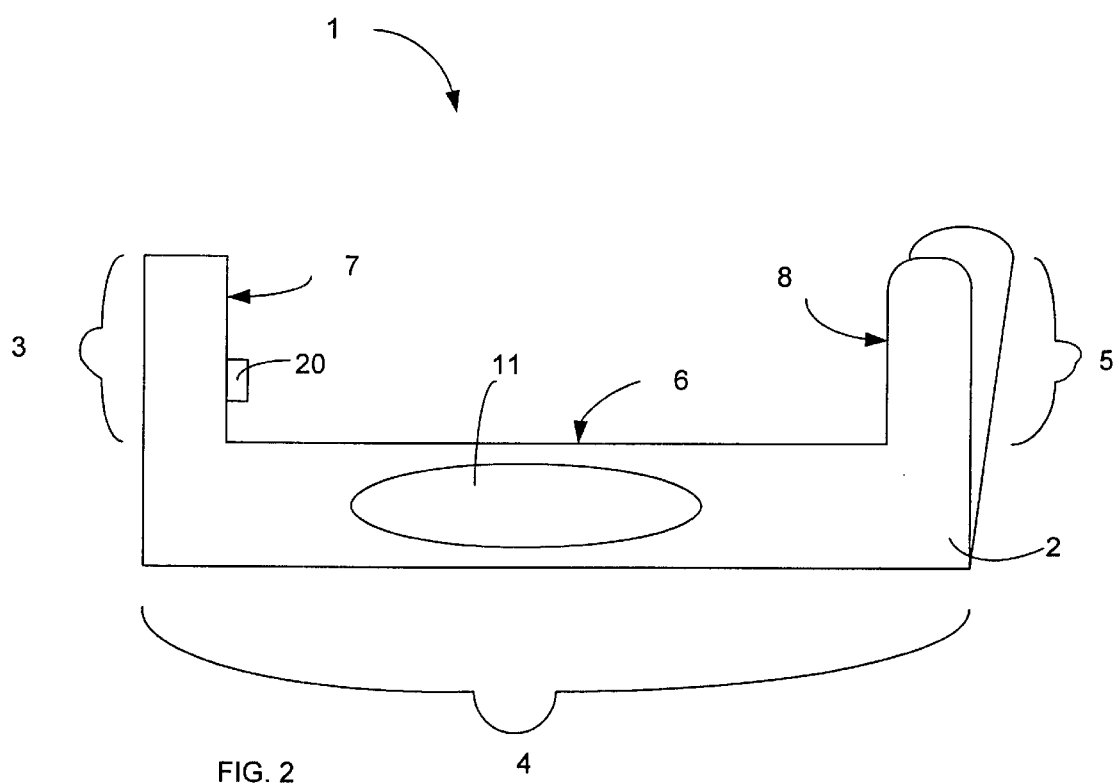
FIG. 2 is a side view of the cradle shown in FIG. 1 in accordance with one embodiment of the present claimed invention.

Referring now to FIG. 2, it can be seen that projecting member 5 and projecting member 3 extend from main body 4. Receiving surface 7 lies on one side of projecting member 3 and is adapted to receive a handheld personal computer. Similarly, receiving surface 8 lies on one side of projecting member 5 and is adapted to receive a handheld personal computer. Receiving surface 6 extends along the top surface of main body 4. Together, receiving surfaces 6, receiving surface 7, and receiving surface 8 form a u-shaped cavity, shown as cavity 9, that is adapted to receive a handheld personal computer. The dimensions of cavity 9 are tailored to conform with different handheld personal computer designs such that a particular handheld personal computer fits within cavity 9. Alternatively, cradle 1 may be designed to receive multiple different handheld personal computer designs.

Continuing with FIG. 2, connection mechanism 20 extends from projecting member 3. Connection mechanism 20 is adapted to couple to a corresponding connection mechanism on a handheld personal computer. In one embodiment connection mechanism 20 is a connector that includes pins that are adapted to couple with sockets on a corresponding connector of a handheld personal computer.

Figure 3:
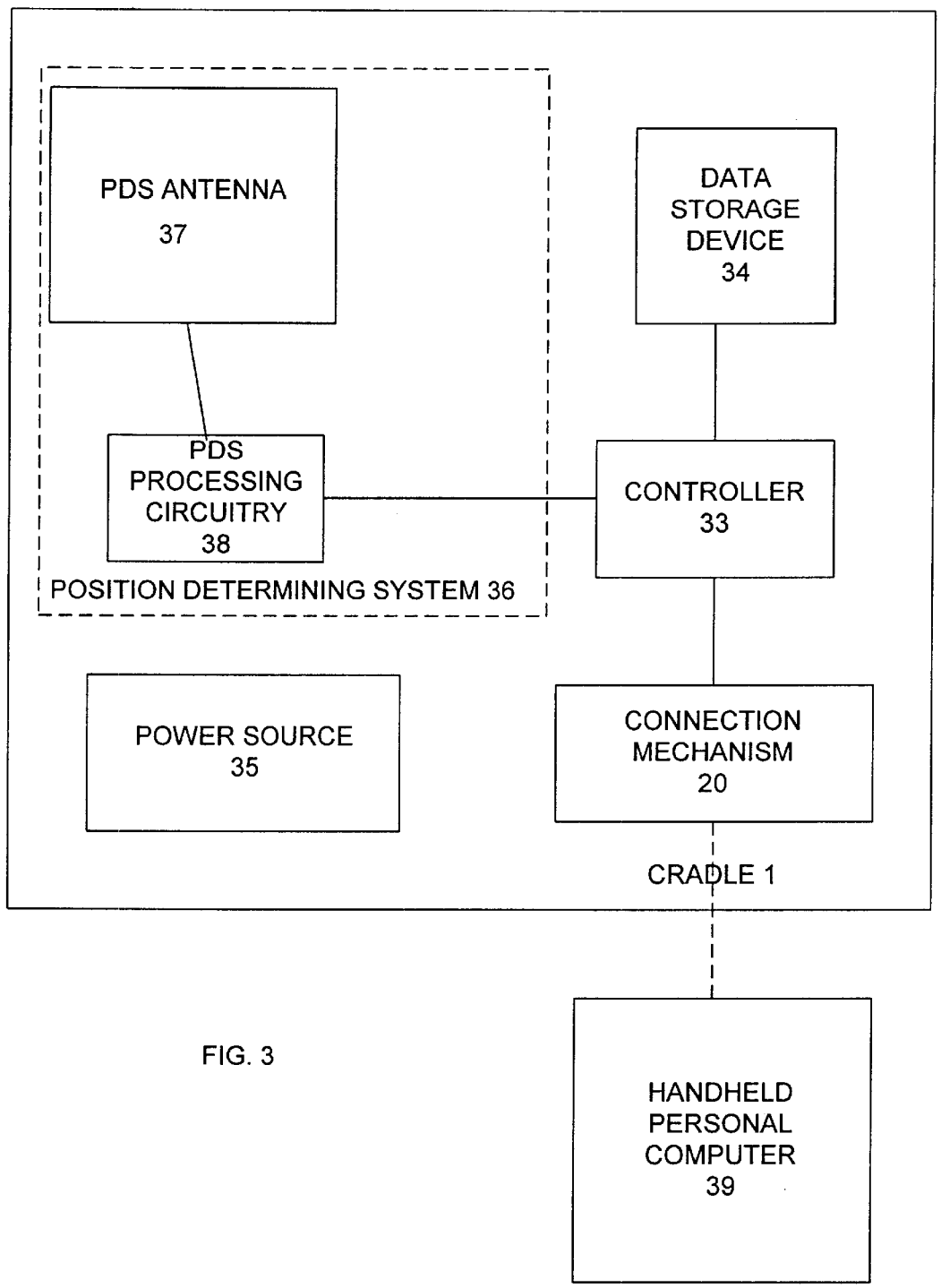
FIG. 3 is a schematic diagram of a cradle that is coupled to a handheld personal computer in accordance with one embodiment of the present claimed invention.

FIG. 3 shows an embodiment of cradle 1 that includes position determination system 36 that is adapted to determine position. In one embodiment, position determination system 36 includes position determination system antenna 37 and position determination system processing circuitry 38.

Continuing with FIG. 3, in one embodiment, position determination system 36 is adapted to determine position using a Satellite Positioning System such as the U.S. Global Positioning System (GPS). In the present embodiment, reference to a position determination system herein refers to a Global Positioning System (GPS), to a Global Orbiting Satellite System (GLONASS), and to any other positioning system, including pseudolites and dead reckoning systems, that provides information by which an observer's position can be determined. The term "position determination system", as used herein, is intended to include pseudolite or equivalents of pseudolites, and the term "position determination system signals" and "position determination system data," as used herein, is intended to include position determination system-like signals and data from pseudolites or equivalents of pseudolites. Also, signals from other sources such as LORAN, Wide Area Augmentation System (WAAS) satellites, etc. may be used to determine position. The position determination system may also provide information by which an observer's velocity and/or the time of observation can be determined.

Continuing with FIG. 3, in one embodiment, position determination system 36 is a commercially available position determination system such as a GPS position determination system, manufactured by Trimble Navigation, Ltd. of Sunnyvale, Calif. However, any of a number of other commercially available position determination systems could be used.

Controller 33 is coupled to position determining system 36 and controls the operations of cradle 1. Controller 33 is disposed within housing 2 of FIGS. 1–2 and is coupled to connection mechanism 20. In one embodiment, controller 33 is a general-purpose microprocessor that has low power consumption such as, for example, a MIPS R4K microprocessor made by Silicon Graphics Inc., of Mountain View, Calif. In one embodiment, a computer program (not shown) operates on controller 33 for controlling the operations of controller 33. Alternatively, controller 33 can be an Application Specific Integrated Circuit (ASIC) device or a Field Programmable Gate Array (FPGA) device that is programmed to perform the desired functions.

Continuing with FIG. 3, connection mechanism 20 is adapted to be coupled to a handheld personal computer such as handheld personal computer 39. In one embodiment connection mechanism 20 is a connector that includes pins that are adapted to couple with sockets on a corresponding connector within handheld personal computer 39.

Memory storage device 34 is coupled to controller 33 for storing data. Memory storage device 34 may be any of a number of known devices for storing data. In one embodiment, memory storage device 34 includes both a random access memory (RAM) storage device and read only memory. (ROM) storage device.

Continuing with FIG. 3, power source 35 provides power to the various components of cradle. Power source 35 may be any suitable power source that is light-weight and compact such as, for example, AA or AAA batteries. In the embodiment shown in FIG. 4, power source 35 is shown to include four batteries 42 that are AAA batteries. Alternatively, more or fewer batteries could be used, and/or different types of batteries could be used.

Figure 4:
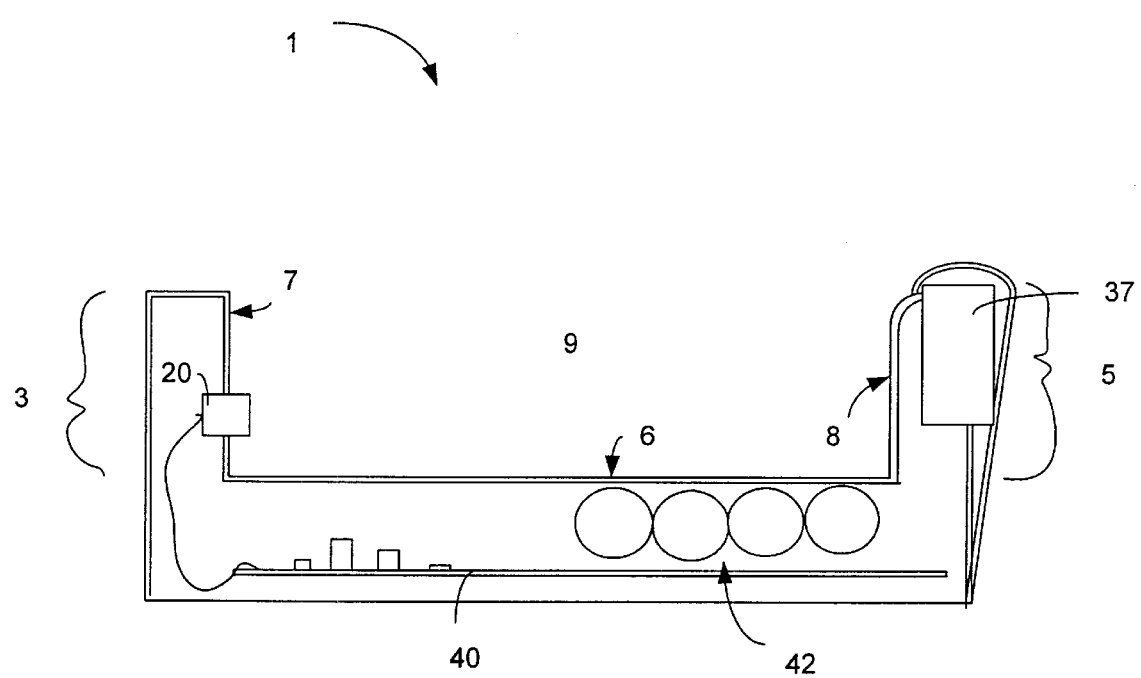
FIG. 4 is a cut-away side view of a cradle in accordance with one embodiment of the present claimed invention.

In the embodiment shown in FIG. 4, position determination system processing circuitry 38, controller 33 and data storage device 34 are disposed on circuit board 40. Circuit board 40 electrically couples to connection mechanism 20 and electrically couples to position determination system antenna 37. In the embodiment shown in FIG. 4, position determination system antenna 37 is shown to be disposed in such a position that position determination signals may be readily received. That is, reception of position determination signals are not blocked by the other components of cradle 1 and are not blocked by a user's hand when cradle 1 is properly held.

Figure 5:
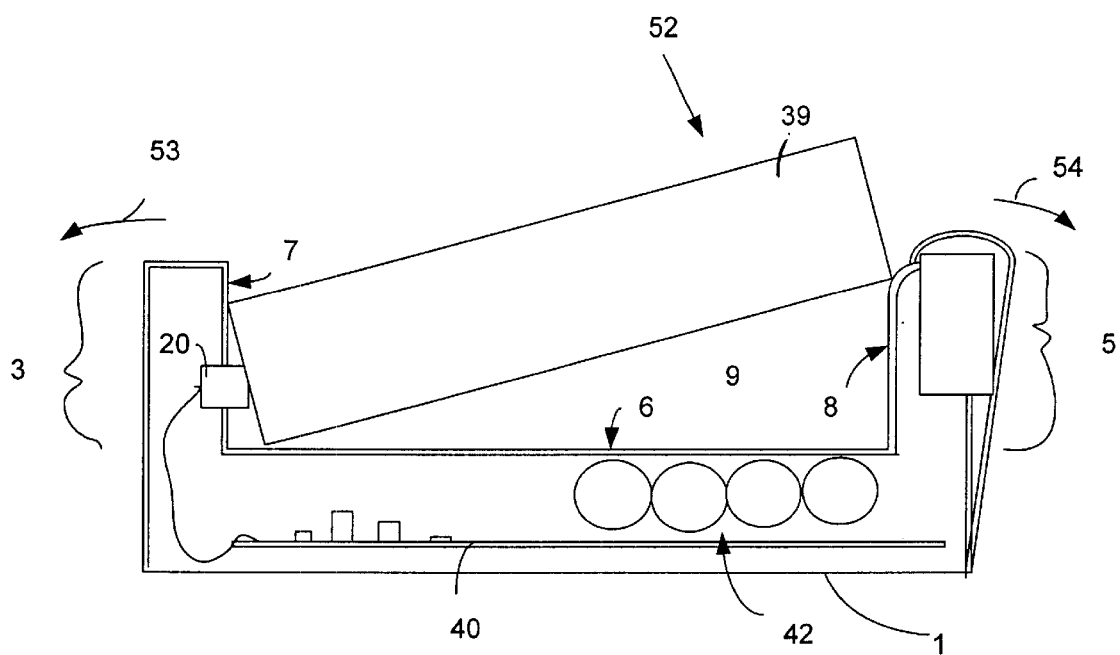
FIG. 5 is a cut-away side view of a cradle into which a handheld personal computer is being inserted in accordance with one embodiment of the present claimed invention.

Referring now to FIG. 5, in operation, a handheld personal computer such as handheld personal computer 39 is placed into cradle 1. The bottom end of handheld personal computer 39 is received by receiving surface 7 while the upper end of handheld personal computer 39 rests against receiving surface 8. Pressing down on handheld personal computer 39 applies forced to receiving surface 7 and receiving surface 8 such that projecting member 3 flexes as shown by arrow 53 and such that projecting member 5 flexes as shown by arrow 54. The application of forced to handheld personal computer 39, as shown by arrow 52, moves handheld personal computer 39 downward into the captured position.

Figure 6:
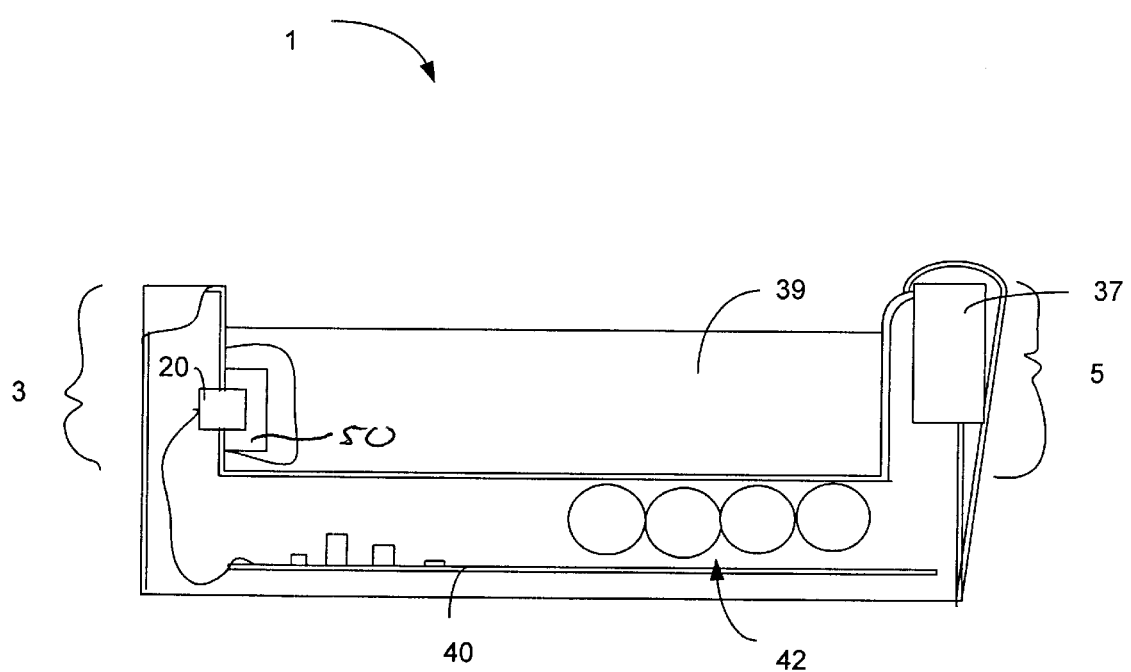
FIG. 6 is a cut-away side view of a cradle into which a handheld personal computer has been inserted in accordance with one embodiment of the present claimed invention.

Referring now to FIG. 6, in the captured position, handheld personal computer 39 is securely held within cavity 9. That is, the bottom of handheld personal computer 39 rests against receiving surface 6 while receiving surface 7 and receiving surface 8 apply sufficient pressure against handheld personal computer 39 so as to hold handheld computer 39 securely in-place. In the captured position, connection mechanism 20 electrically couples handheld personal computer 39 to the electrical circuits disposed on circuit board 40. In the embodiment shown in FIG. 5, connection mechanism 20 is a connector that mates with a corresponding connector receptacle 50, disposed within handheld computer 39.

Figure 7:
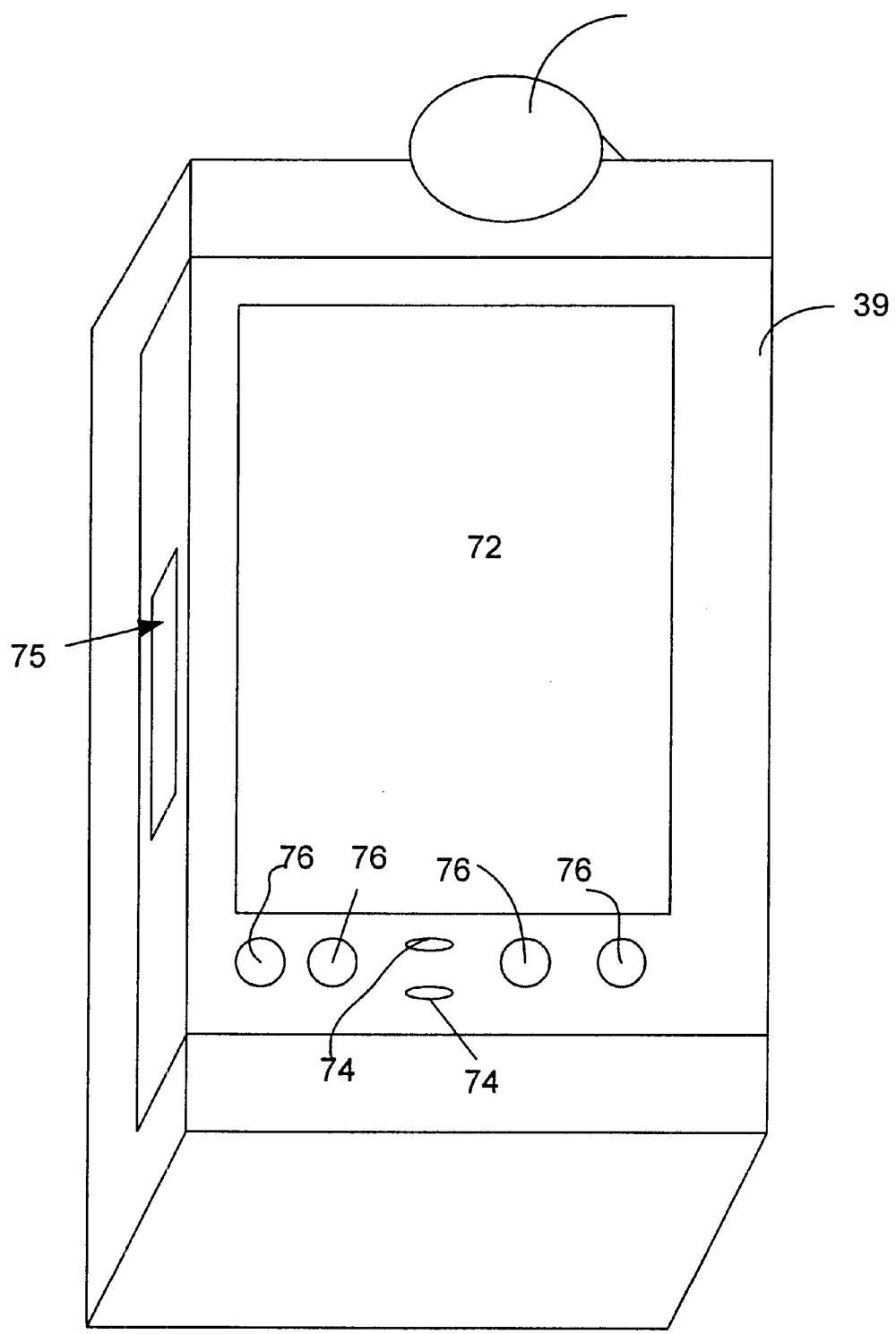
FIG. 7 is a top perspective view of a cradle into which a handheld personal computer has been inserted in accordance with one embodiment of the present claimed invention.

Referring now to FIG. 7, handheld personal computer 39 is shown to include display 72 that extends across most of the upper surface of handheld personal computer 39. Extending below display 72 are function keys 76, and lighted indicators 74. Handheld personal computer 39 also includes PC card slot 75 that is adapted to receive a PC card. In one embodiment, PC card slot 75 is adapted to receive a standard PCMCIA card. Since cradle 1 of the present invention does not require connection to PC card slot 75, PC card slot 75 is freeing for other applications and/or uses.

Continuing with FIG. 7, handheld personal computer 39 may be any of a number of known types of handheld personal computers. In one embodiment, handheld personal computer 39 is an Apple message pad 2100, manufactured by Apple Computer Inc., Cupertino Calif. Alternatively, handheld personal computer 39 may be an Avigo 10, manufactured by Texas Instruments Corp., of Dallas, Tex. Another example of a handheld computer 39 is the PalmPilot professional, manufactured by 3Com Corp. of Mountain View, Calif. and the Cassiopia handheld personal computer, manufactured by Casio Inc., of Dover, N.J. In yet another embodiment, handheld personal computer 39 is a palmtop computer manufactured by PSION PLC of Milton Keynes, UK. In one embodiment, handheld personal computer 39 operates using Windows CE operating system by Microsoft Corporation of Redmond, Wash. Alternatively, any of a number of other operating systems can be used.

Figure 8:
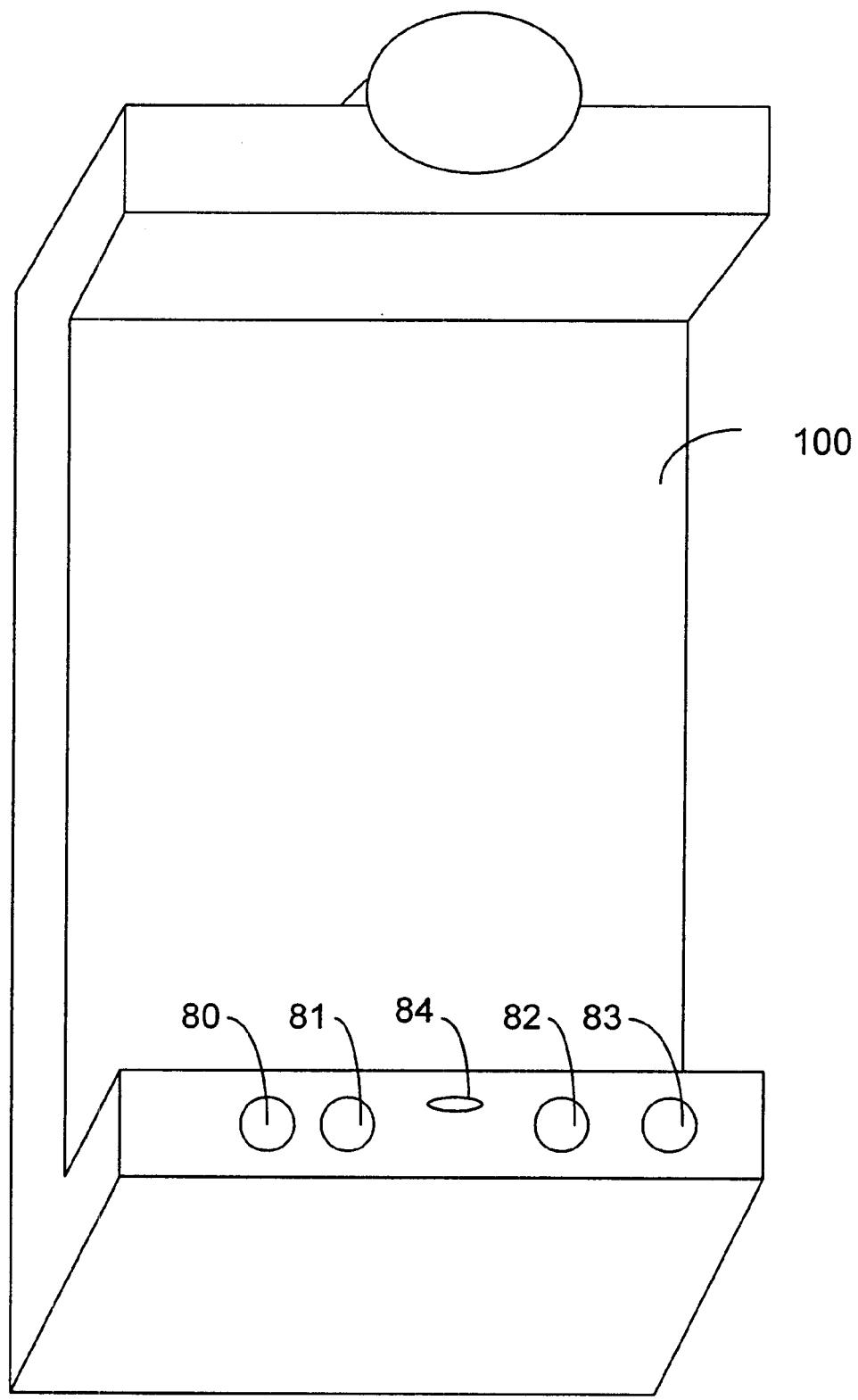
FIG. 8 is a top perspective view of a cradle that includes function keys and indicators in accordance with one embodiment of the present claimed invention.

FIG. 8 shows an alternate embodiment in which cradle 100 includes function keys 80–83 and lighted indicator 84. In one embodiment, function key 80 is operable to turn on cradle 100 and to turn off cradle 100. Function key 81 is operable to initiate the process of determining position. The lighted indicator 84 indicates when cradle 100 is turned on. Function keys 82–83 may be used for any of a number of different purposes, depending on the program and/or function being performed by cradle 100.

Figure 9:
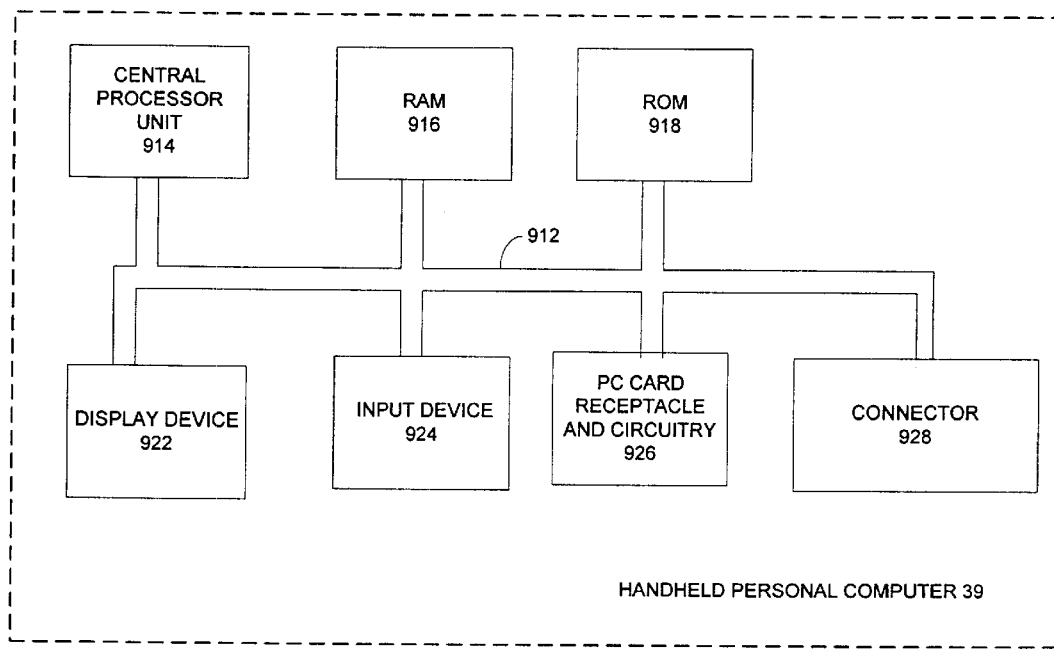
FIG. 9 is a schematic diagram of an exemplary handheld personal computer in accordance with one embodiment of the present claimed invention.

FIG. 9 shows an exemplary handheld personal computer 39 that includes an address/data bus 912 for communicating information, a central processor unit 914 coupled to bus 912 for processing information and instructions. Computer system 39 also includes data storage features such as random access memory 916 coupled to bus 912 for storing information and instructions for central processor unit 914, read only memory 918 coupled to bus 912 for storing static information and instructions for the central processor unit 914.

Continuing with FIG. 9, computer 39 also includes display device 922 that is coupled to bus 912 for displaying information to an operator. Display device 922 is a liquid crystal device, cathode ray tube, or other display device suitable for creating graphic images and/or alphanumeric characters recognizable to the user. In one embodiment, display device 922 is identical to display 72 of FIG. 7. Input device 924 of computer system 39 is coupled to bus 912. Input device 924 allows for user input and can include alphanumeric and/or function keys for communicating information and command selections to central processor unit 14. In one embodiment, input device 924 includes a touchpad operable in conjunction with display device 922 for coupling input to processor unit 14 or other suitable device for coupling information and command selection to processor unit 914.

Continuing with FIG. 9, computer system 39 also includes a connector 928 for coupling to external devices. In one embodiment, computer system 39 includes a connector 928 that is identical to connector receptacle 50 of FIG. 5.

Still referring to FIG. 9, computer system 39 also includes PC card receptacle and circuitry 926. In one embodiment, PC card receptacle and circuitry 926 conforms with one or more standard of the Personal Computer Memory Card International Association (PCMCIA) PC Card Standard, published by the PCMCIA in Sunnyvale, Calif. In one embodiment, PC card receptacle and circuitry 926 includes a PC card slot disposed on one side of handheld personal computer that is identical to PC card slot 75 shown in FIG. 7.

Still referring to FIG. 9, in one embodiment, data storage device 54 includes a flash memory storage device. The flash memory storage device may be disposed integrally within the housing of computer system 39 or may be included in a memory card that is inserted into the PC card receptacle.

Figure 10:
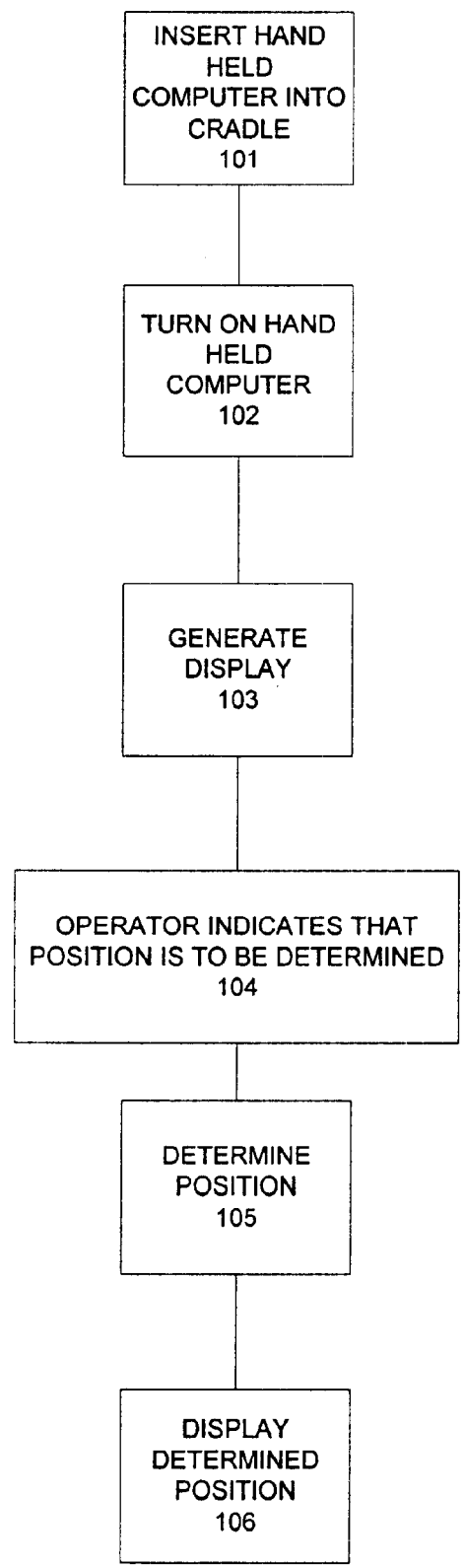
FIG. 10 is flow chart that illustrates a method for determining position in accordance with one embodiment of the present claimed invention.

FIG. 10 shows a method for determining position according to the present invention. First, a handheld personal computer is inserted into a cradle as shown by step 101. In the embodiment shown in FIGS. 5–6, this is accomplished by inserting handheld personal computer 39 into cradle 1, as shown by FIG. 5. Next, pressure is applied to be handheld personal computer 39 as shown by arrow 52 of FIG. 5. This results in a handheld personal computer 39 that is coupled to a cradle 1, as shown in FIG. 6.

Continuing with FIG. 10, the system is then turned on. In the embodiment shown in FIGS. 1–7, the system is turned on by operation of handheld personal computer 39 so as to turn on handheld personal computer 39. This is typically accomplished by pressing an on/off switch. In the embodiment shown in FIG. 8, the system can be turned on by pressing on/off switch 80. In the embodiment shown in FIG. 8, controller 33 is operable to communicate with a handheld personal computer so as to automatically turn on the handheld personal computer when a handheld personal computer is secured within cradle 100.

Containing the FIG. 10, as shown by step 103, controller 33 is operable to generate a display on the handheld personal computer. In the embodiment shown in FIG. 3, controller 33 is operable to communicate with the operating system of handheld personal computer 39 so as to generate a display on display 72. In one embodiment, instructions are stored within data storage device 34, and are executed by controller 33 for generating the display.

Still referring to FIG. 10, as shown by step 104, the operator then indicates that position is to be determined. In the embodiment shown in FIG. 7, when display 72 includes a selection mechanism that is a touch screen, an icon including the words "determine position" is displayed. The user then touches the touch screen over the icon so as to indicate that position is to be determined. In the embodiment shown in FIG. 8, pressing a dedicated function key such as, for example, function key 81 indicates that position is to be determined.

Still referring to FIG. 10, position is then determined as shown by step 105. In one embodiment of the present invention position is determined using signals from satellites of the U.S. GPS. Methods for determining position using the GPS are well known in the art. A useful discussion of methods for determining position using satellites of the GPS is included in the reference Global Positioning System: Theory and Application, edited by Bradford W. Parkinson and James J. Spilker, American Institute of Aeronautics and Astronautics, Inc., Washington, D.C., which is incorporated herein as background material.

Continuing with FIG. 10, as shown by step 106, the determined position from step 105 is displayed. In the embodiment shown in FIG. 7, the determined position is displayed on display 72. The determined position may be displayed as coordinates, or may be indicated by an icon on a map. In an embodiment that allows for the determined position to be displayed as an icon on a map, a map database is stored in data storage device 54. The stored map database may be any of a number of known, commercially available map databases, such as, for example, an Etak map database, manufactured by Etak Corporation of Menlo Park, Calif. Alternatively, TIGER files, available through the U.S. Census Bureau as a map database or a software program such as, Map Info, manufactured by Map Info Corporation of Troy, N.Y., could be used.

Figure 11:
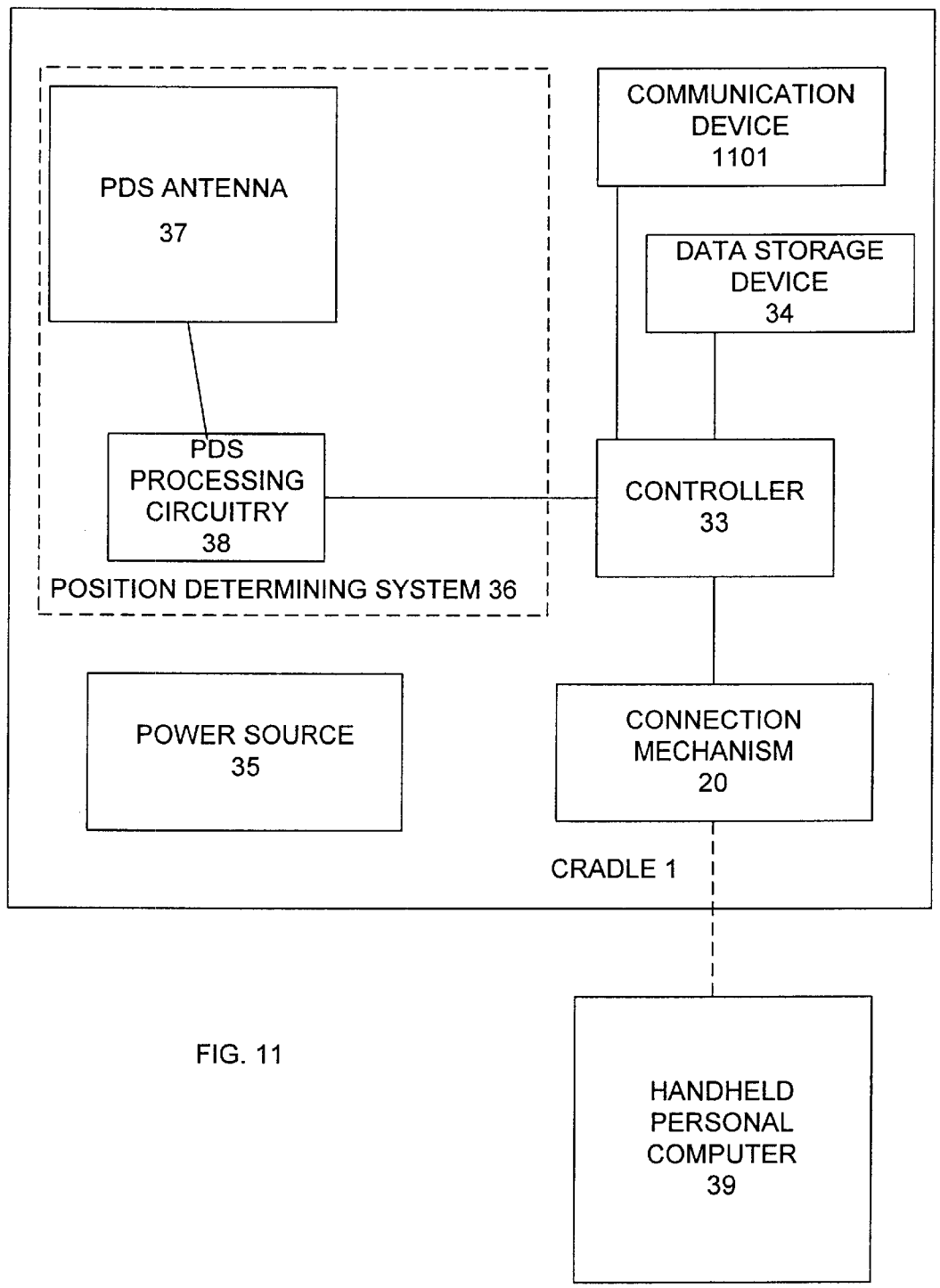
FIG. 11 is a schematic diagram of a cradle that includes a communication device and that is coupled to a handheld personal computer in accordance with one embodiment of the present claimed invention.

FIG. 11 shows an embodiment of the present invention that includes a communication device 1101. Communication device 1101 can be any type of communication device that allows for sending and/or receiving data, voice communication, etc. In one embodiment of the present invention, communication device 1101 is adapted to communicate via a cellular telephone network. The cellular telephone network can be either terrestrial or satellite-based and transmission can be either digital (e.g. Personal Cellular Services, Advanced Mobile Phone Service, Groupe Special Mobile, etc.) or analog. Alternatively, communication device 1101 is a digital communication device adapted to receive and/or send data via a communication network. The communication network can be terrestrial or satellite-based and may use any of a number of different communication formats such as, for example, Cellular Digital Packet Data, one-way paging, two-way paging, etc. Communication device 1101 can be a radio transmitter and/or receiver, a DGPS receiver, a pager, etc. Alternatively, communication device 1101 is an internet wireless communication device such as the internet wireless communication devices of the Ricochet network, available through Metricom, Inc. of Los Gatos, Calif.

The method and apparatus of the present invention is well adapted for input and display of waypoints. The present invention is also well adapted for indicating a travel path to one or more waypoints. In one embodiment, a visible map is displayed that indicates the location and of the user and indicates one or more waypoints. The display also indicates the travel path between the current location of the user and a designated waypoint. In one embodiment, the map display is a moving map display that indicates the position of the user The present invention is also well adapted for use with handheld personal computers that include two pieces that are hinged together. This style of handheld personal computer typically includes a display disposed on the inside of the uppermost piece and a keypad disposed within the top of the lowermost piece. Examples of this style on handheld personal computer includes the Cassiopia A-20, manufactured by Casio Inc., of Dover N.J., the NEC Mobile Pro 700 series manufactured by NEC computer systems division of Packard Bell NEC, Boxborough, Mass., and the Phillips Velo 500, manufactured by Phillips Mobile Computing Group, Sunnyvale Calif., the HP 620 LX Palmtop PC, manufactured by Hewlett-Packard Co., of Palo Alto, Calif. and the Sharp Mobilon HC-4500C, manufactured by Sharp Electronics Corp., of Mahwah, N.J.

The present invention is also well adapted for use using different designs of cradle. In one alternate embodiment, a cradle design(not shown) is used that receives handheld personal computers that snap into the cradle. In another alternate embodiment, a cradle design(not shown) is used that receives handheld personal computers that clip onto the cradle. In yet another alternate embodiment, a cradle design (not shown) is used that receives handheld personal computers that slide into the cradle.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A cradle for a handheld personal computer comprising:
   a) a housing adapted to selectively couple to a handheld personal computer, said housing includes a cavity that is adapted to receive a handheld personal computer such that a handheld personal computer can be disposed within said cavity so as to securely couple the handheld personal computer to said housing;
   b) a connection mechanism disposed in said housing and adapted to electrically couple to a handheld personal computer;
   c) a position determination system disposed in said housing and adapted to determine position; and
   d) a controller disposed within said housing and electrically coupled to said connection mechanism and electrically coupled to said position determination system, said controller adapted to communicate with a handheld personal computer such that position can be determined and coupled to a handheld personal computer.

2. The cradle of claim 1 further comprising:
   e) a communication device, said communication device disposed in said housing.

3. The cradle of claim 2 wherein said controller further comprises a microprocessor.

4. The cradle of claim 2 wherein said communication device is a digital communication device.

5. The cradle of claim 4 wherein said digital communication device is a pager.

6. The cradle of claim 2 wherein said communication device is a cellular telephone.

7. The cradle of claim 1 further comprising:

f) a data storage device disposed in said housing and coupled to said controller.

8. The cradle of claim 7 further comprising:

g) a software program that operates on said controller, said software program operable to control the operations of a handheld personal computer such that, upon coupling a handheld personal computer that includes a display to said cradle, said software program generates a visible display on the display of said handheld computer.

9. The cradle of claim 1 further comprising a function key disposed within said housing for receiving user input.

10. A cradle for handheld personal computer comprising:

a) a housing adapted to receive a handheld personal computer, said housing having a main body, a first projecting member projecting proximate one the end of said main body, and a second projecting member projecting proximate the other end of said housing, said first projecting member and said second projecting member adapted to flex with regard to said main body such that a handheld personal computer can be inserted between said first projecting member and said second projecting member, said housing comprises plastic that is selectively flexible so as to allow said first projecting member to flex relative to said main body and said second projecting member to flex relative to said main body;

b) a connection mechanism disposed in said housing such that said connection mechanism extends from said first projecting member, said connection mechanism disposed such that, upon the insertion of a handheld personal computer into said cradle, said connection mechanism is electrically coupled with said handheld personal computer;

c) a position determination system disposed in said housing for determining position; and d) a controller for controlling the operations of said cradle, said controller coupled to said connection mechanism and coupled to said position determination system, said controller adapted to communicate with a handheld personal computer such that, upon the insertion of a handheld personal computer into said cradle, position determined by said position determination system is coupled to said handheld personal computer.

11. The cradle of claim 10 further comprising:

e) a communication device, said communication device disposed in said housing.

12. The cradle of claim 11 wherein said communication device is a digital communication device.

13. The cradle of claim 11 wherein said communication device is a cellular telephone.

14. The cradle of claim 12 wherein said digital communication device is a pager.

15. The cradle of claim 11 further comprising:

f) a data storage device disposed in said housing and coupled to said controller.

16. The cradle of claim 13 further comprising:

a plurality of function keys, said plurality of function keys adapted to receive user input for initiating the determination of position and adapted to receive user input for storing and recalling waypoints.

17. A method for determining position using a handheld personal computer comprising the steps of:

a) inserting a handheld computer that includes a display device into a cradle adapted to receive said handheld computer, said cradle adapted to electrically couple to said handheld computer, said cradle including a position determination system and a controller, said cradle further including a cavity that is adapted to receive a handheld personal computer such that a handheld personal computer can be disposed within said cavity so as to securely couple the handheld computer to said housing;

b) turning on said handheld computer;

c) determining position upon receiving operator input indicating that position is to be determined; and d) generating a display on said display device that indicates the position determined in step c).

18. The method for determining position using a handheld personal computer of claim 17 wherein step d) further comprises the step of displaying a map on said display, and displaying an icon on said display, the position of said icon indicating the position of said cradle.

* * * * *